United States Patent [19]
Wang et al.

[11] Patent Number: 5,932,855
[45] Date of Patent: Aug. 3, 1999

[54] COMPOSITE ACTUATING DEVICE

[75] Inventors: Shih-Hsuan Wang; Chung-Hua Kuo, both of Taipei, Taiwan

[73] Assignee: Inventec Corporation, Taipei, Taiwan

[21] Appl. No.: 08/950,901

[22] Filed: Oct. 15, 1997

[30] Foreign Application Priority Data

Apr. 8, 1997 [TW] Taiwan .................................. 86205374

[51] Int. Cl.$^6$ .................................................. H01H 9/22
[52] U.S. Cl. ..................................... 200/50.04; 200/61.64
[58] Field of Search ............................. 200/50.04, 61.64, 200/61.67, 61.81, 50.1, 50.12, 50.18, 50.02

[56] References Cited

U.S. PATENT DOCUMENTS 3,622,720  11/1971  Allen ....................................... 200/50.1
4,006,121  2/1977  Isono ..................................... 200/61.64

Primary Examiner—Renee S. Luebke
Attorney, Agent, or Firm—Smith, Gambrell & Russell, LLP; Beveridge, DeGrandi, Weilacher & Young Intellectual Property Group

[57] ABSTRACT

A composite actuating device is provided for use on an electronic device, such as an electronic notepad or an electronic dictionary machine. The composite actuating device of the invention includes a casing, a cover adapted to be reclosably hinged to the casing and having a locking structure provided in one end thereof, and a power switch mounted in the casing, a button which can trigger the power switch when operated; and a latching device which is capable of locking the cover in closed position on the casing when engaged with the locking structure on the cover, the latching device being linked to the button such that the latching device is disengaged from the locking structure on the cover when the button is operated to trigger the power switch. This allows the actions of unlocking the cover and switching on the power of the electronic device to be simultaneously achieved simply by operating one button by the user.

5 Claims, 2 Drawing Sheets

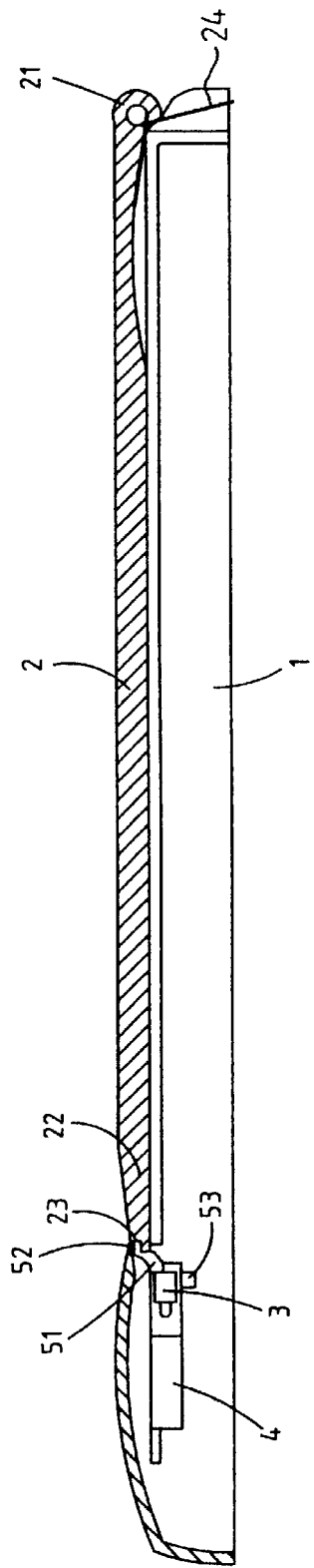
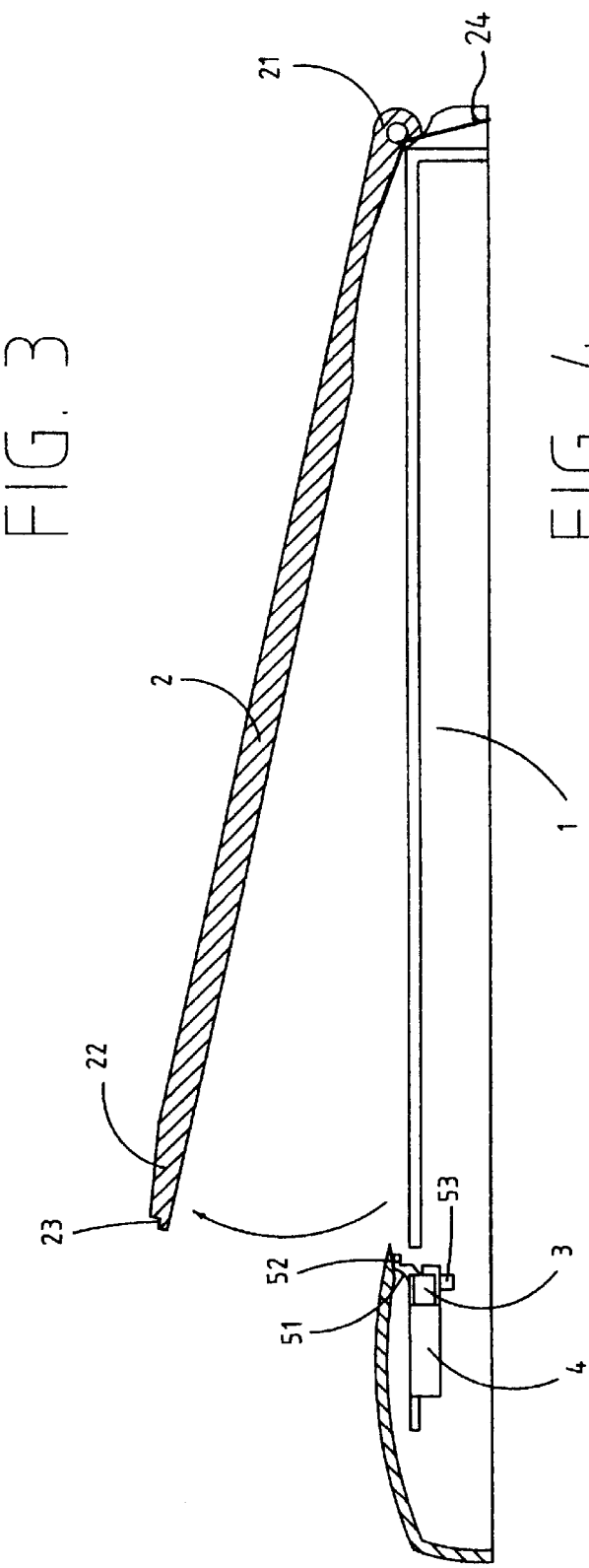

COMPOSITE ACTUATING DEVICE

BACKGROUND OF THE INVENTION

1. Field of the Invention

This invention relates in general to a composite actuating device used for an electronic device, such as an electronic notepad, an electronic dictionary machine, or a palm top computer. It allows the user to open the cover and simultaneously switch on the power of the electronic device simply by operating one button on the composite actuating device.

2. Description of Related Art

Electronic notepads and dictionary machines are small-scale computers that provide the user with some specific computer-related functions such as taking notes or checking the meaning of words. These machines typically include a cover on which a screen is provided for display of information thereon. Before using these machines, the user needs to first unlock and unveil the cover, and then press a power button under the cover to switch on the machine.

One drawback to the foregoing devices, however, is that the user needs to carry out at least the two actions of unlocking the cover and then pressing the power button, which is quite inconvenient and somewhat time-consuming. There exists, therefore, a need for a new device which allows the user to be able to use the electronic notepads or dictionary machines quickly by pressing down just one button, without having to carry out the actions of unlocking the cover and pressing the power button.

SUMMARY OF THE INVENTION

It is therefore a primary objective of the present invention to provide a composite actuating device used for an electronic device, such as an electronic notepad or an electronic dictionary machine, which allows the actions of unlocking the cover and switching on the power of the electronic device to be achieved simply by operating one button by the user.

In accordance with the foregoing and other objectives of the present invention, a composite actuating device for electronic device is provided. Broadly speaking, the composite actuating device of the invention includes:

a casing;

a cover adapted to be reclosably hinged to the casing and having a locking means provided in one end thereof;

a power switch mounted in the casing;

a button adapted for triggering the power switch when pressed down or slided from one side to another; and a latching device which is capable of locking the cover in closed position on the casing when fastened to the locking means on the cover, the latching device being linked to the button such that the latching device is disengaged from the locking means on the cover when the button is pressed down or slided from one side to another to trigger the power switch.

The foregoing composite actuating device can allow the user to open the cover and simultaneously switch on the power of the electronic device simply by pressing down the button.

The latching device includes a linkage bar and a protruded locking piece connected to the linkage bar which are pivotally turnable about a pivot monitored on the casing. When the cover is in closed position, it is locked in position by the protruded locking piece of the latching device being fitted into the locking means of the cover. When the button is pressed down or slided from one side to another, a push bar formed on the button will push against the head of the linkage bar, thereby causing the latching device to be turned counterclockwise about the pivot mounted on the casing. As a result, the protruded locking piece of the latching device is withdrawn from the locking position with the locking means of the cover, thus freeing the cover from locked condition, allowing the cover to be flipped open by means of, for example, an elastic means provided at the hinge of die cover. Moreover, the latching device includes a spring having a first elongated end fixed to the casing and a second elongated end fixed to the back of the protruded locking piece. When the protruded locking piece is withdrawn from the locking position with the locking means of the cover, the second elongated end is twisted, such that when the button is released, the elastic force from the twisted second elongated end of the spring can help the protruded locking piece of the latching device to return to the original position.

The locking means provided on the cover can be a slot formed on one side of the cover which is engaged to the protruded locking piece on the latching device when the cover is locked in closed position. When the cover is in closed position on the casing, the protruded locking piece of the latching device is inserted in the slot in the cover, thereby locking the cover in position on the casing. Further, when the user wants to use the electronic device, he/she simply needs to press down the button or slide the button from one side to another, whereby the button is moved to come in touch with the power switch, thereby triggering the power switch to switch on the power of the electronic device; and simultaneously, the push bar on the button push against the head of the linkage bar, thereby causing the latching device to be turned about the pivot such that the protruded locking piece of the latching device is withdrawn from the locking position with the slot of the cover and freeing the cover from locked condition, thus allowing the cover to be flipped open by means of the elastic means provided at the hinge of the cover. Therefore, as a result of operating the button, the power of the electronic device is switched on and simultaneously the cover is unlocked.

In conclusion, the composite actuating device of the invention can be used for an electronic device with a cover to allow the actions of unlocking the cover and switching on the power of the electronic device to be simultaneously achieved simply by operating one button provided thereon by the user. This allows a simplification in the operational procedure to use the electronic device. The electronic devices provided with the composite actuating device of the invention is therefore friendlier in operation to the user.

BRIEF DESCRIPTION OF DRAWINGS

The invention can be more fully understood by reading the following detailed description of the preferred embodiments, with reference made to the accompanying drawings, wherein:

FIG. 3 is a schematic sectional diagram of the electronic device of FIG. 1 when the cover is locked to the casing; and FIG. 4 is a schematic sectional diagram of the electronic device of FIG. 1 when the cover is unlocked from the casing.

DETAILED DESCRIPTION OF PREFERRED EMBODIMENTS

Figure 1:
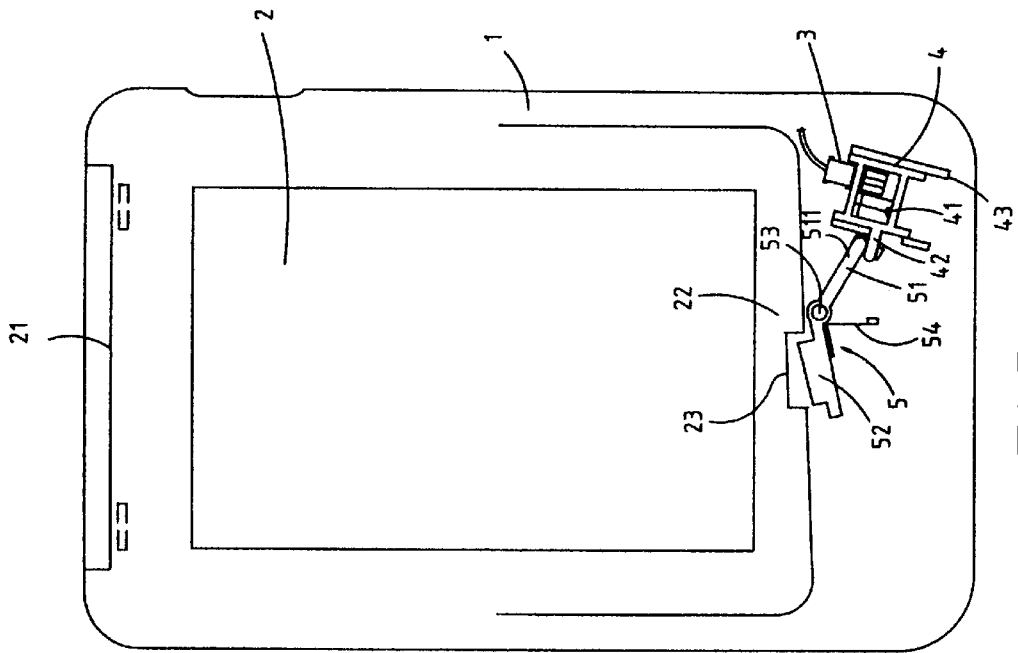
FIG. 1 is a schematic diagram of an electronic device which is provided with the composite actuating device of the invention when the cover is locked to the casing.

FIG. 1 through FIG. 4 show a preferred embodiment of the composite actuating device of the invention. As shown, the composite actuating device includes a casing 1, a cover 2, a power switch 3, a button 4, and a latching device 5. The cover 2 has a first end 21 hinged to the casing 1 and a second end 22 formed with a locking means, such as a slot 23, which allows the cover 2 to be locked by the latching device 5 when the cover 2 is in closed position. The latching device 5 and the power switch 3 are both mounted on the bottom of the casing 1. The power switch 3 is wired to connect to a power source (not shown) mounted in the casing 1.

Figure 2:
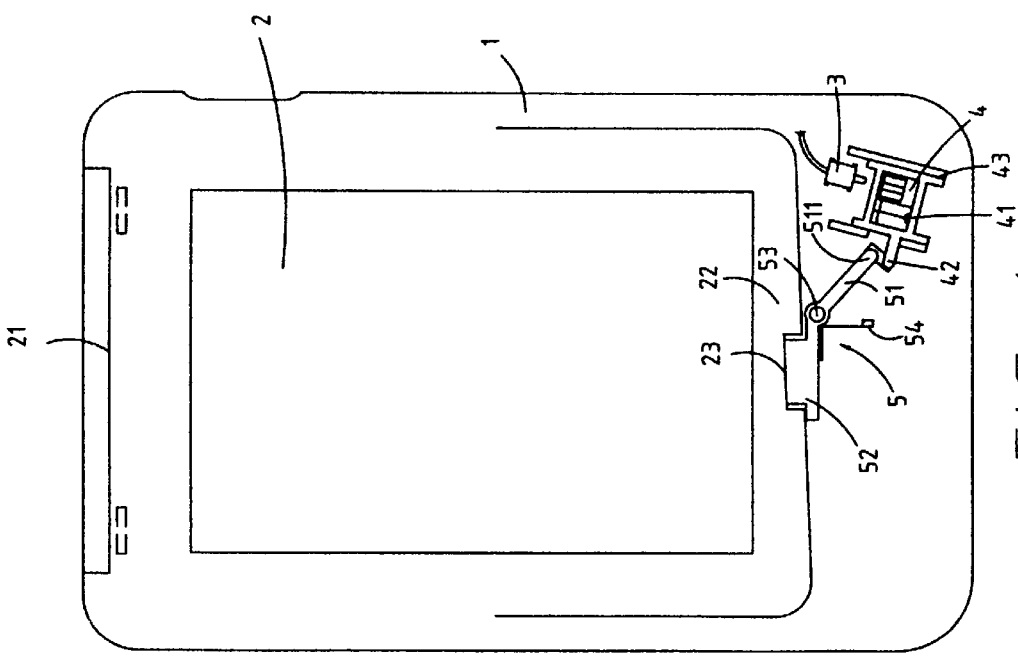
FIG. 2 is a schematic diagram of the electronic device of FIG. 1 when its cover is unlocked from the casing.

The button 4 is shown able to be slideably mounted on a guide rail 43 formed on the bottom of the casing 1 and provided with a spring 41 and a push bar 42. As shown in FIG. 2, when the button 4 is slid toward the power switch 3, it will slide down the guide rail 43 and come in touch with the power switch 3, thereby triggering the power switch 3 to switch on the power of the electronic device. Meanwhile, the spring 41 is compressed. After being released, the button 4 will be restored to its original position by means of the elastic force from the compressed spring 41.

The latching device 5 includes a linkage bar 51 and a protruded locking piece 52 which are pivotally turnable about a pivot 53 mounted on the casing 1. When the cover 2 is in closed position, it is locked in position by the protruded locking piece 52 of the latching device 5 being fitted into the slot 23 in the second end 22 of the cover 2, as illustrated in FIG. 1. When the button 4 is slid to come in touch with the power switch 3, as illustrated in FIG. 2, the push bar 42 of the button 4 will push against the head 511 of the linkage bar 51, thereby causing the latching device 5 to be turned counterclockwise (with respect to the top view of FIG. 2). As a result, the protruded locking piece 52 of the latching device 5 is withdrawn from the locking position with the slot 23 in the second end 22 of the cover 2, thus freeing the cover 2 from locked condition, allowing the cover 2 to be flipped open by means of a biasing spring 24 provided at the hinge of the cover 2. Moreover, the latching device 5 also includes a spring 54 having a first elongated end fixed to the casing 1 and a second elongated end fixed to the back of the protruded locking piece 52. As shown in FIG. 2, when the protruded locking piece 52 is withdrawn from the locking position with the slot 23 in the cover 2, the second elongated end is twisted, such that when the button 4 is released, the elastic force from the twisted second elongated end of the spring 54 can help the protruded locking piece 52 of the latching device 5 to return to the original position.

As shown in FIG. 1, when the cover 2 is in closed position on the casing 1, the protruded locking piece 52 of the latching device 5 is inserted in the slot 23 of the cover 2, thereby locking the cover 2 in position on the casing 1. Further, as shown in FIG. 2, when the user wants to use the electronic device, he/she simply needs to slide the button 4 toward the power switch 3, whereby the button 4 will slide down the guide rail 43 and come in touch with the power switch 3, thereby triggering the power switch 3 to switch on the power of the electronic device; and simultaneously, the push bar 42 on the button 4 will push against the head 511 of the linkage bar 51, thereby causing the latching device 5 to be turned about the pivot 53 such that the protruded locking piece 52 of the latching device 5 is withdrawn from the slot 23 in the second end 22 of the cover 2, freeing the cover 2 from locked condition, and allowing the cover 2 to be flipped open by the biasing spring 24 provided at the hinge of the cover 2. Therefore, as a result of sliding the button 4, the power of the electronic device is switched on and simultaneously the cover 2 is unlocked to an open condition.

In conclusion, the composite actuating device of the invention can be used for an electronic device with a cover to allow the actions of unlocking the cover and switching on the power of the electronic device to be simultaneously achieved simply by operating one button by the user. This allows a simplification in the operational procedure in preparing to use the electronic device. The electronic devices provided with the composite actuating device of the invention will therefore be more friendlier in operation to the user.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A composite actuating device for an electronic device comprising:

a casing;

a cover adapted to be reclosably hinged to said casing and having a locking means provided in one end thereof of;

a power switch mounted in said casing;

a button mounted on said casing and being movable to switch on said power switch when operated;

a latching device which is capable of engaging said locking means to hold said cover in a closed position on said casing, a linkage for connecting said latching device to said button to disengage said latching device from said locking means of said cover when said button is moved to switch on said power switch;

said power switch being operated by said button independently of said linkage.

2. The composite actuating device of claim 1, wherein said button is slidable along a guide rail formed within said casing.

3. The composite actuating device of claim 1, wherein said locking means is a slot formed in one end of said cover.

4. The composite actuating device of claim 1, wherein said latching device includes:

a protruded locking piece for engaging with said locking means to lock said cover in closed position;

a pivot to which said protruded locking piece is connected;

a linkage bar connected to said protruded locking piece and linked to said button such that said linkage bar is turnable about said pivot when said button is operated to switch on said power switch; wherein when said linkage bar is turned by the operation of said button, said protruded locking piece is being withdrawn from said locking means in said cover.

5. The composite actuating device of claim 4, further comprising:

a spring having a first elongated end fixed to said casing and a second elongated end fixed to said protruded locking piece; wherein when said protruded locking piece is being disengaged from said locking position with said locking means of said cover, the second elongated end is twisted, such that when said button is released, the elastic force from the twisted second elongated end of said spring restores said protruded locking piece of said latching device to original position.

* * * * *